(12) United States Patent
Tetlow

(10) Patent No.: US 7,675,197 B2
(45) Date of Patent: Mar. 9, 2010

(54) APPARATUS AND METHOD FOR INDUCTIVE POWER TRANSFER

(75) Inventor: Stephen Douglas Tetlow, Wellington (NZ)

(73) Assignee: Auckland Uniservices Limited, Auckland (NZ)

( * ) Notice: Subject to any disclaimer, the term of this patent is extended or adjusted under 35 U.S.C. 154(b) by 418 days.

(21) Appl. No.: 11/570,874

(22) PCT Filed: Jun. 17, 2004

(86) PCT No.: PCT/NZ2004/000123
§ 371 (c)(1), (2), (4) Date: Jul. 3, 2007

(87) PCT Pub. No.: WO2005/124962
PCT Pub. Date: Dec. 29, 2005

(65) Prior Publication Data
US 2007/0247005 A1    Oct. 25, 2007

(51) Int. Cl.
*H01F 38/14*    (2006.01)
(52) U.S. Cl. .................................................... 307/104
(58) Field of Classification Search ................. 307/104; 180/168; 363/75; 340/854.8, 310.17, 310.11
See application file for complete search history.

(56) References Cited

U.S. PATENT DOCUMENTS

| | | | |
|---|---|---|---|
| 6,317,338 B1 | 11/2001 | Boys | |
| 6,705,441 B1* | 3/2004 | Boys et al. | 191/10 |
| 6,906,495 B2* | 6/2005 | Cheng et al. | 320/108 |
| 6,972,543 B1* | 12/2005 | Wells | 320/108 |
| 7,042,196 B2* | 5/2006 | Ka-Lai et al. | 320/108 |
| 7,126,450 B2* | 10/2006 | Baarman et al. | 336/121 |

* cited by examiner

*Primary Examiner*—Albert W Paladini
(74) *Attorney, Agent, or Firm*—Black Lowe & Graham, PLLC

(57) ABSTRACT

Apparatus is disclosed for allowing an inductive power distribution system pick-up to be located at an extended distance from the system primary conductive path. The apparatus has an elongate housing (40) which has a first coil (14) at one end to receive energy from a magnetic field associated with the primary conductive path. A second coil (16) is provided at the other end of the housing and is electrically connected to the first coil to produce a magnetic field for the supply of electrical energy to the pick-up. The circuit formed by the two coils is tuned to have a desired resonant frequency.

42 Claims, 7 Drawing Sheets

APPARATUS AND METHOD FOR INDUCTIVE POWER TRANSFER

CROSS-REFERENCE To RELATED APPLICATIONS

Figure 1:
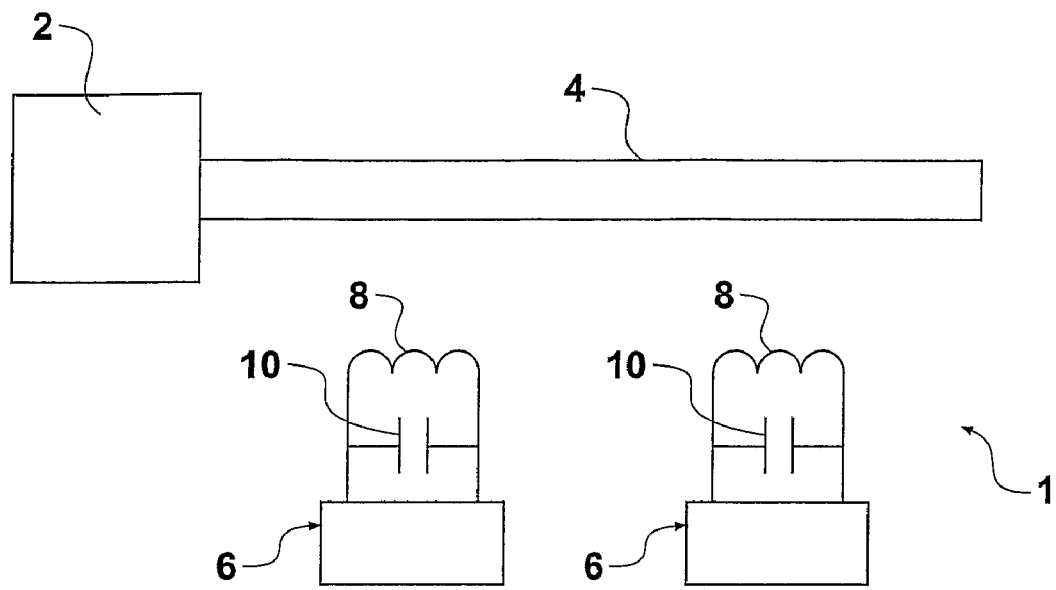

This application constitutes a national phase application based on PCT Application Serial No. PCT/NZ2004/000123 entitled "APPARATUS AND METHOD FOR INDUCTIVE POWER TRANSFER," filed on Jun. 17, 2004.

FIELD OF INVENTION

This invention relates to inductive power distribution systems commonly known as inductive power transfer (IPT) systems.

BACKGROUND

Inductive power transfer systems for use in distributing electrical energy are now well known. These systems typically comprise an elongate primary conductor which is energised at a desired frequency so that a number of tuned "pick-up" or secondary power distribution units which are positioned closely adjacent to the primary conductor may be energised by the magnetic field associated with the primary conductor. Therefore, IPT systems have the advantage that a contactless power distribution system is achieved.

These systems have significant benefits in a number of applications such as lighting for roadways, tunnels, swimming pools and aircraft. In particular these systems are particularly advantageous for use in situations where an unfavourable environment for power distribution may exist. For example, roadways are subject to considerable physical stresses due to large fast moving vehicles. Illuminated road studs that are powered by fixed wiring are difficult to wire in to the roadway and are prone to failure due to stresses from vehicles that can physically move the stud or the adjacent road surface and allow foreign matter such as water or dirt to interfere with the wired connection.

An issue with illuminated road stud IPT systems, where the primary conductor is required to be buried in the road substrate, is that it can be necessary to transfer power over an extended distance or gap from the primary conductor. Although the primary conductor may be buried at a suitable level to enable adequate power transfer when such a system is first installed, roadways often need to be resealed which can extend the distance between the primary conductor and the pick-up. As distance from the primary conductor increases, less may power may be transferred, until such time as the light supplied by the pick-up becomes weak or does not function at all.

A solution to this problem has been proposed in U.S. Pat. No. 6,317,338 which suggests use of an intermediate resonant circuit. This is a resonant circuit which may be placed between the primary conductor and one or more of the secondary pick-ups. In the context of lighting systems, the specification discloses an intermediate resonant circuit which comprises an inductive element and a capacitive element, the values of which are selected to provide resonance at a desired frequency. Therefore, the intermediate resonant circuit is energised by energy derived from the magnetic field associated with the primary conductor. As a result of energisation of the intermediate resonant circuit, a magnetic field is established which in effect extends the field associated with the primary conductor. This allows power to be transferred over an extended distance or gap from the primary conductor.

U.S. Pat. No. 6,317,338 discloses intermediate resonant circuit constructions of conductors that have inductive and capacitive properties that lie parallel to the primary conductor. This is undesirable in many practical applications, for example in a road stud installation a significant section of roadway needs to be cut or excavated to install such a system. This form of circuit presents installation difficulties if primary cables need to be run through an existing cable duct in a structure such as a bridge. Also, the physical construction of such a circuit is difficult to manufacture and is prone to failure. If a road including this known design needs surface reconstruction, then there is a substantial risk that the intermediate resonant circuit will be destroyed. Finally, the known arrangement has the disadvantage that is effectively only intercepts the field from one of the conductors in the primary conductive path.

OBJECT

It is an object of the present invention to provide an IPT system or a component for such a system that allows pick-ups to be located at an extended distance from a primary conductor that will at least partially obviate one or more problems or disadvantages mentioned above, or which will at least provide a useful alternative.

BRIEF SUMMARY OF THE INVENTION

In one aspect the invention provides an IPT system field extension device including:

a first coil adapted to receive energy from a magnetic field associated with a primary conductive path of an IPT system;

a second coil electrically connected to the first coil and provided remote from the first coil, and being adapted to produce a magnetic field for supply of electrical energy to a pick-up of an IPT system; and a tuning capacitance provided in series or parallel with the first and second coils to enable the circuit so formed to have a desired resonant frequency.

In a preferred embodiment the first coil is retained within a first housing and the second coil is retained within a second housing.

One of the first or second housings may be at last partly received within the other of the first or second housings.

A filler material may be provided between each coil and its respective housing part.

The filler material preferably comprises an electrically non-conductive material.

In a preferred embodiment the filler material comprises a material having property of elasticity or resilience. The filler material may comprise an epoxy resin or a particulate material such as silicone sand.

Each housing part may be constructed from a cylindrical plastics material such as PVC conduit. Alternatively the housing may be constructed from a ceramic material.

The housing and filler material may both be constructed from flexible material.

In a preferred embodiment the first coil is provided at or adjacent to the first end of an elongate housing and the second coil is provided at or adjacent to the second end of the housing.

The first or second coil may be formed about a ferrite core such as an E core, a toroid, or a pot core.

In a further aspect the invention provides an IPT system including:
a primary conductor;
at least one pick-up coil capable of generating a voltage by magnetic induction from the primary conductor;
an intermediate resonant circuit provided between the primary conductor and a pick-up coil, the intermediate resonant circuit including a first coil adapted to receive energy from a magnetic field associated with a primary conductive path of an IPT system, a second coil electrically connected to the first coil and being adapted to produce a magnetic field for supply of electrical energy to a pick-up of an IPT system, the first coil being provided adjacent to the primary conductive path, the second coil being provided adjacent to the at least one pick-up coil, and a tuning capacitance provided in series or parallel with the first and second coils to enable the circuit so formed to have a desired resonant frequency.

The invention also provides one or more of:
a pathway such as a roadway, footpath, aisle or sidewalk;
a tunnel;
a handrail;
a pool installation;
including an IPT system set forth above.

In yet a further aspect the invention provides a method of producing an IPT system field extension device, the method including steps of:
providing a first coil;
providing an elongate housing having an interior space;
placing the first coil in the interior space to locate the first coil at or adjacent to one end of the housing;
providing a second coil;
placing the second coil in the interior space to locate the second coil at or adjacent to another end of the housing;
filling the space between the housing and the coils with a filler material.

In a still further aspect the invention provides a method of installing an IPT system including the steps of laying a primary conductive path in a channel such that the primary conductive path is substantially surrounded by stationary material, drilling at least one hole in the stationary material, providing an IPT system field extension device as set forth above in the at least one hole, and locating an IPT pick-up adjacent to the entrance to the hole remote from the primary conductive path.

Further aspects of the invention will become apparent from the following description which is given by way of example.

DRAWING DESCRIPTION

Figure 2:
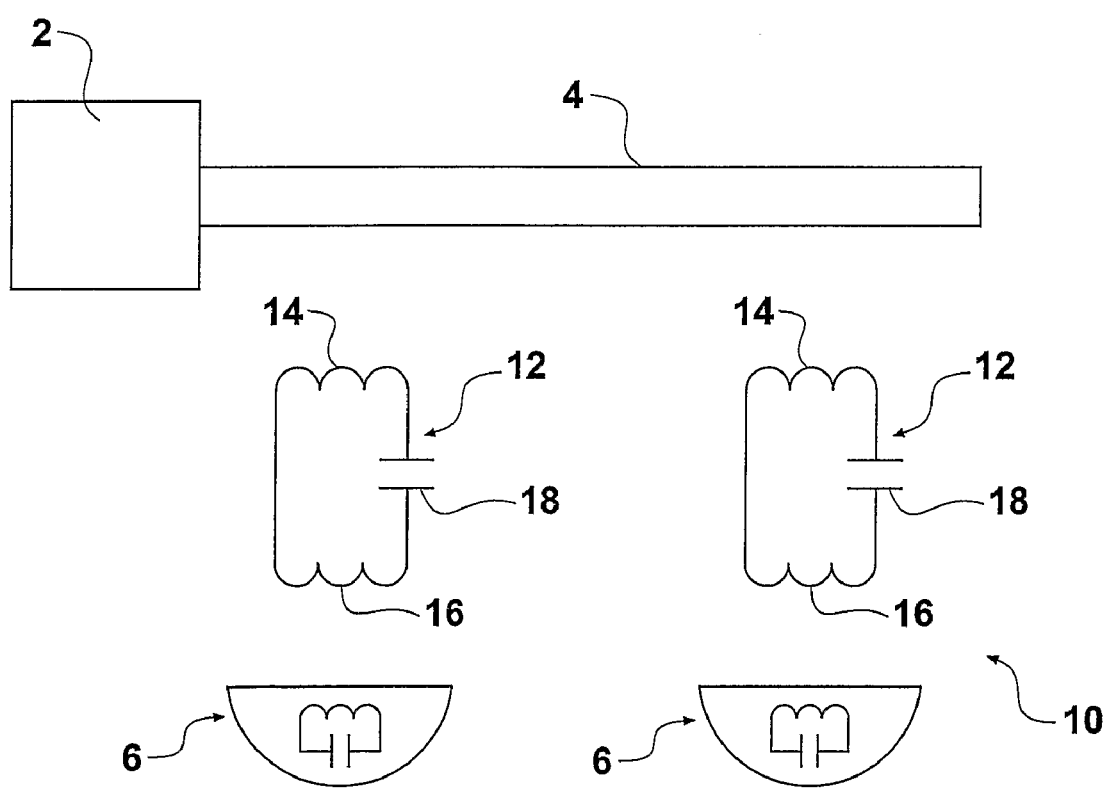
Figure 3:
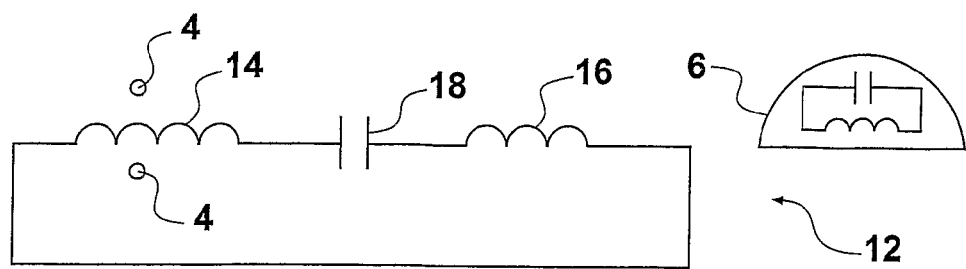
Figure 4A:
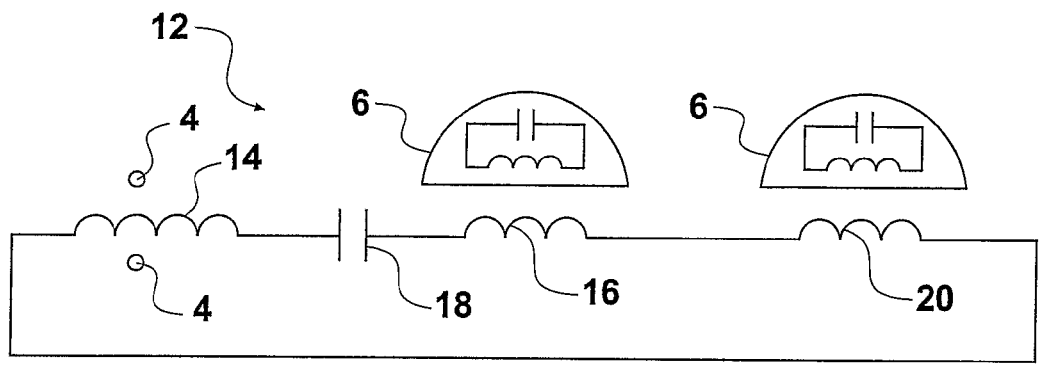
Figure 4B:
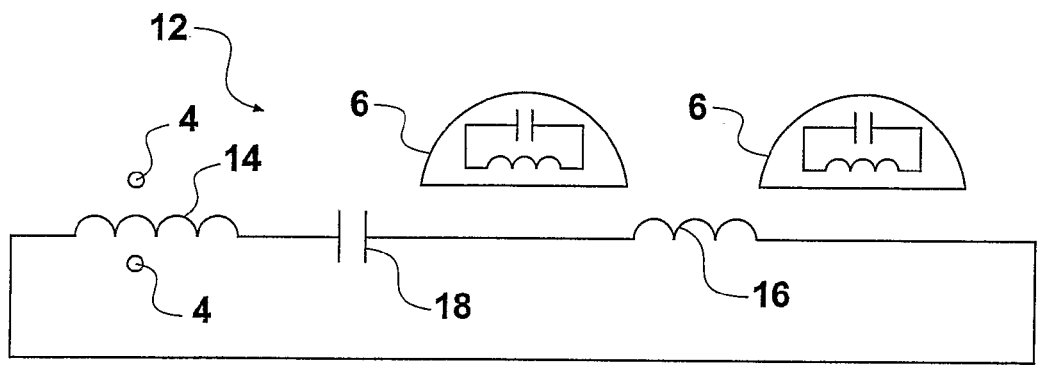
Figure 5:
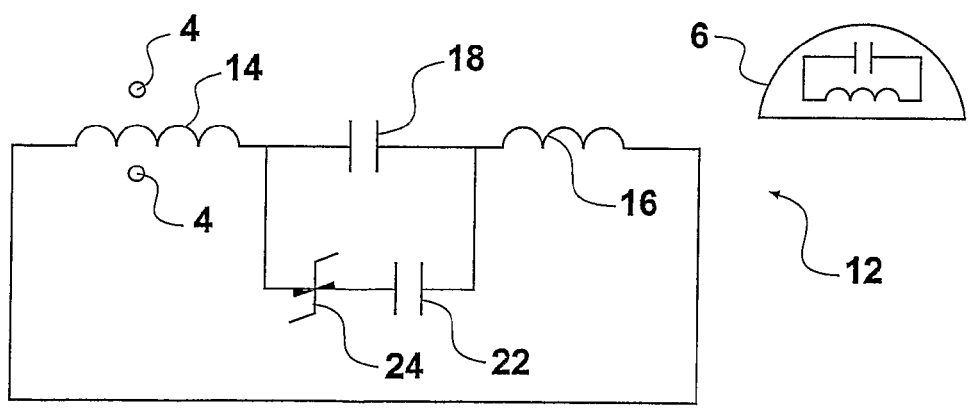
Figure 6A:
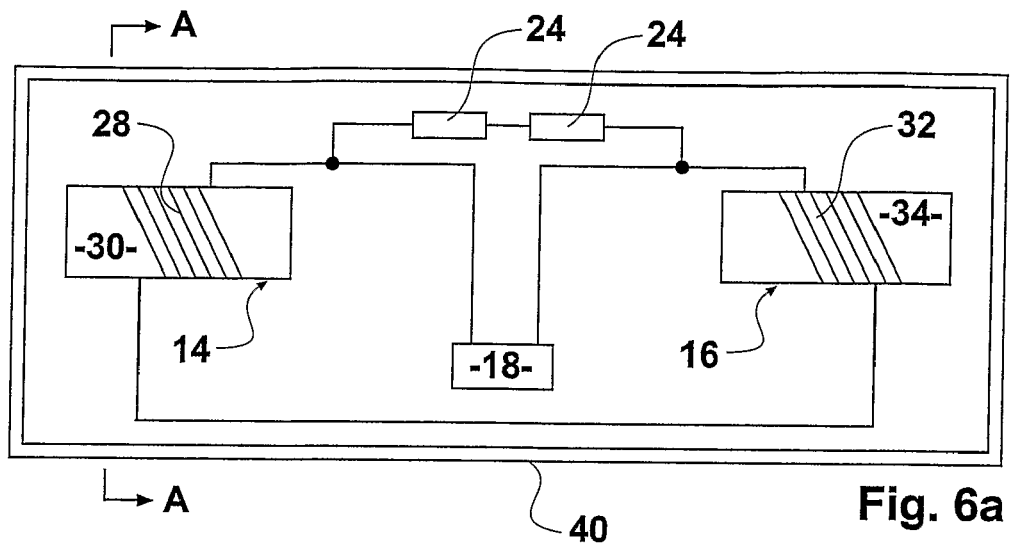
Figure 6B:
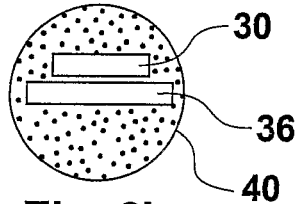
Figure 7:
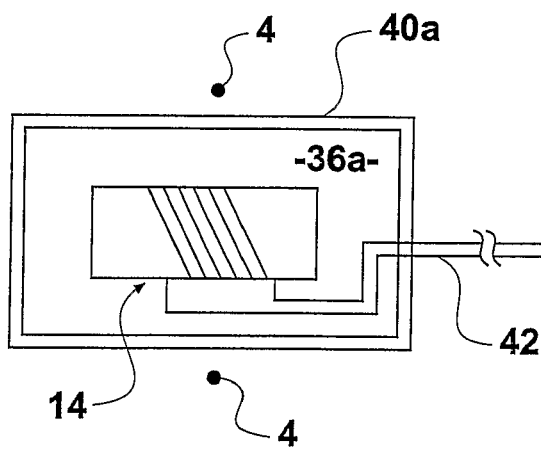

One or more embodiments of the invention will now be described by way of example with reference to the accompanying drawings in which:

FIG. 1: is a diagram of a known IPT system topology;

FIG. 2: is a diagram of an IPT system including field extension apparatus to enable a field associated with the primary conductor to power one or more pick-ups, which in this example are shown as road studs;

FIG. 3: is a diagrammatic view of field extension apparatus located adjacent to a primary conductor (which is shown in cross-section) to supply electrical energy to a road stud;

FIG. 4a: is a diagram of the apparatus of FIG. 3 used to power two road studs;

FIG. 4b: is a diagram of the apparatus of FIGS. 3 and 4 having one coil which is used to power two road studs;

FIG. 5: is a diagram of the apparatus of FIG. 3 but further including a detuned capacitor and zener diodes;

FIG. 6a: is an elevation in partial cross section of field extension apparatus;

FIG. 6b: is an elevation and partial cross section of field extension apparatus;

FIG. 7: is an elevation in partial cross section through an altenative embodiment of field extension apparatus.

Figure 8B:
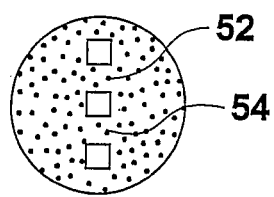
Figure 8A:
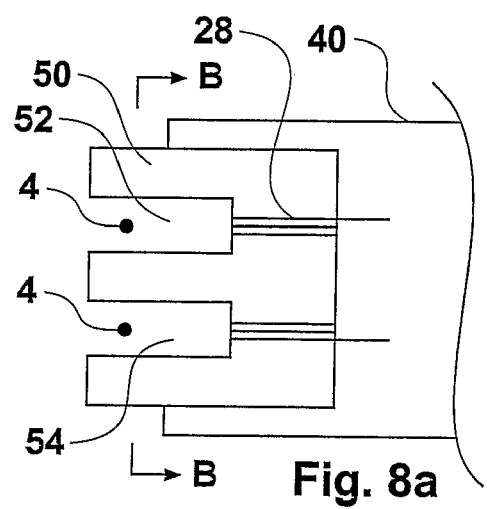
Figure 9B:
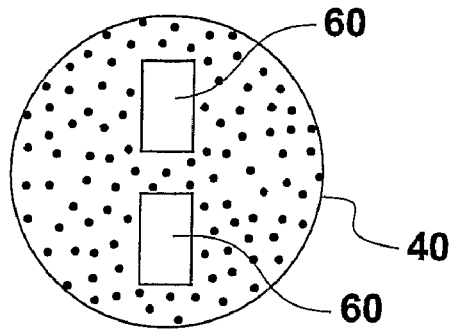
Figure 9A:
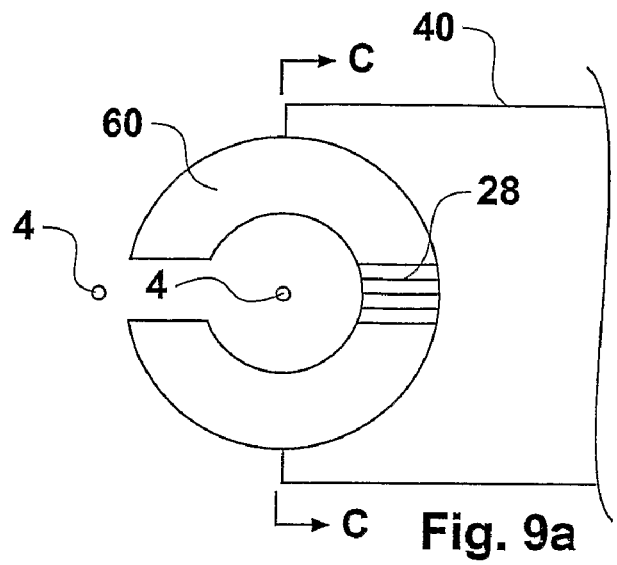
Figure 10B:
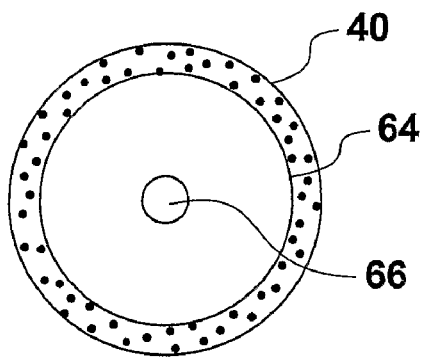
Figure 10A:
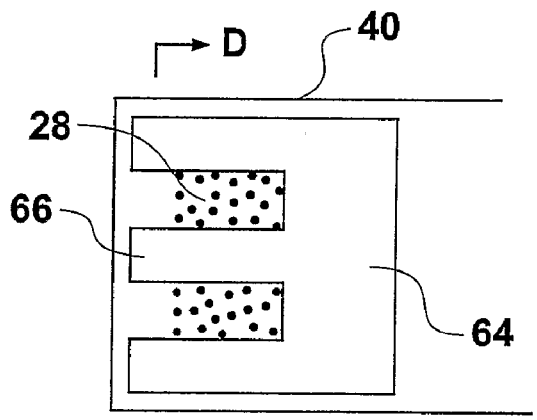
Figure 11A:
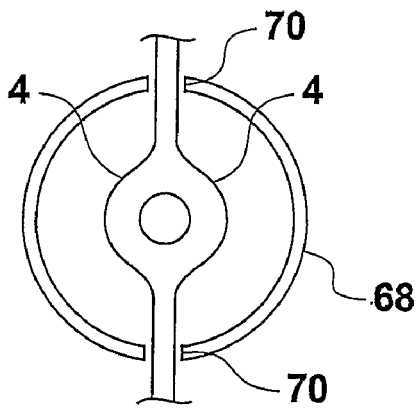
Figure 11B:
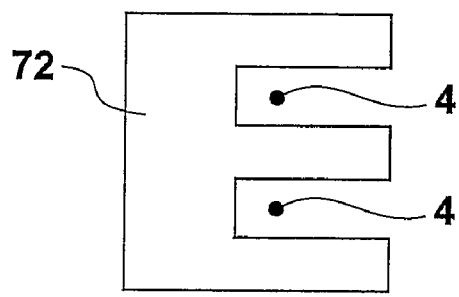
Figure 17:
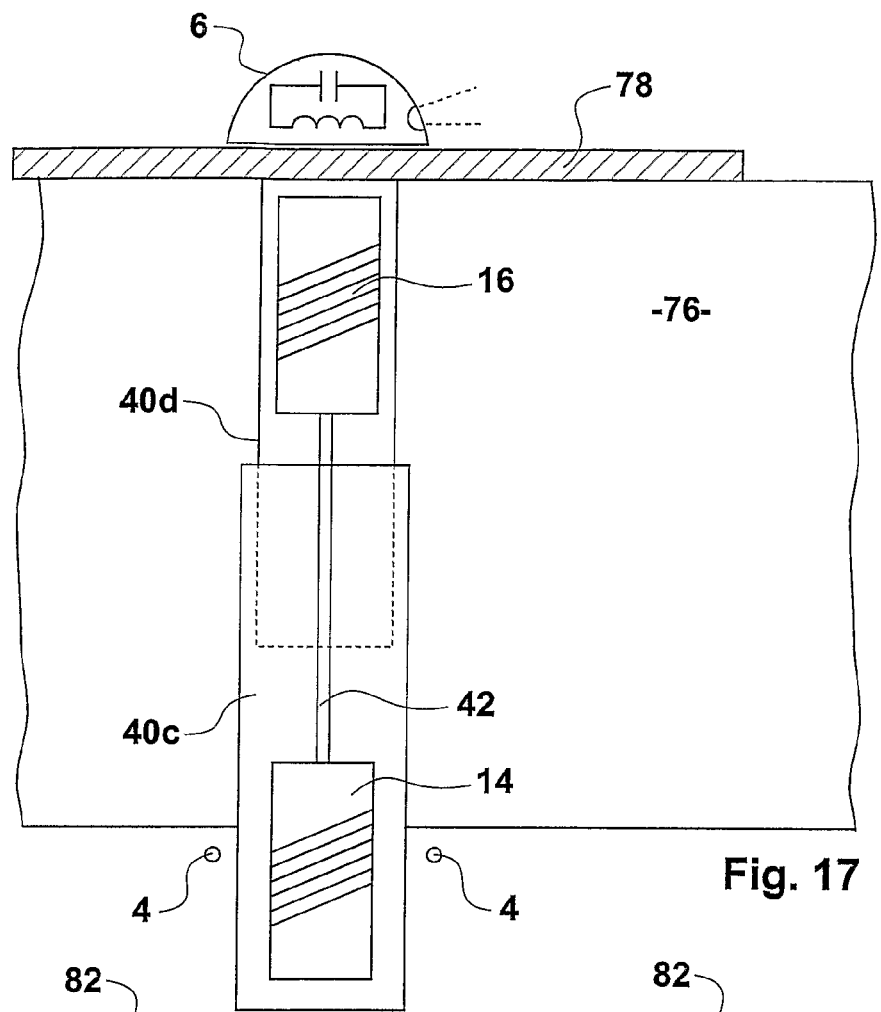
Figure 18:
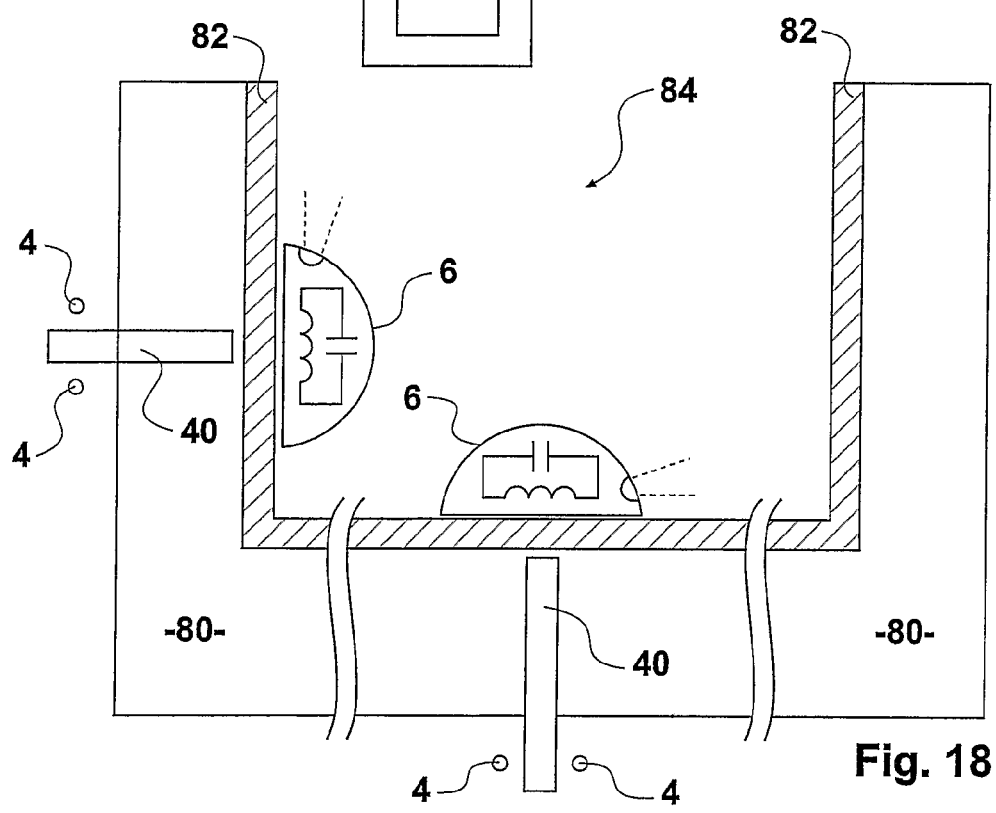
Figure 19:
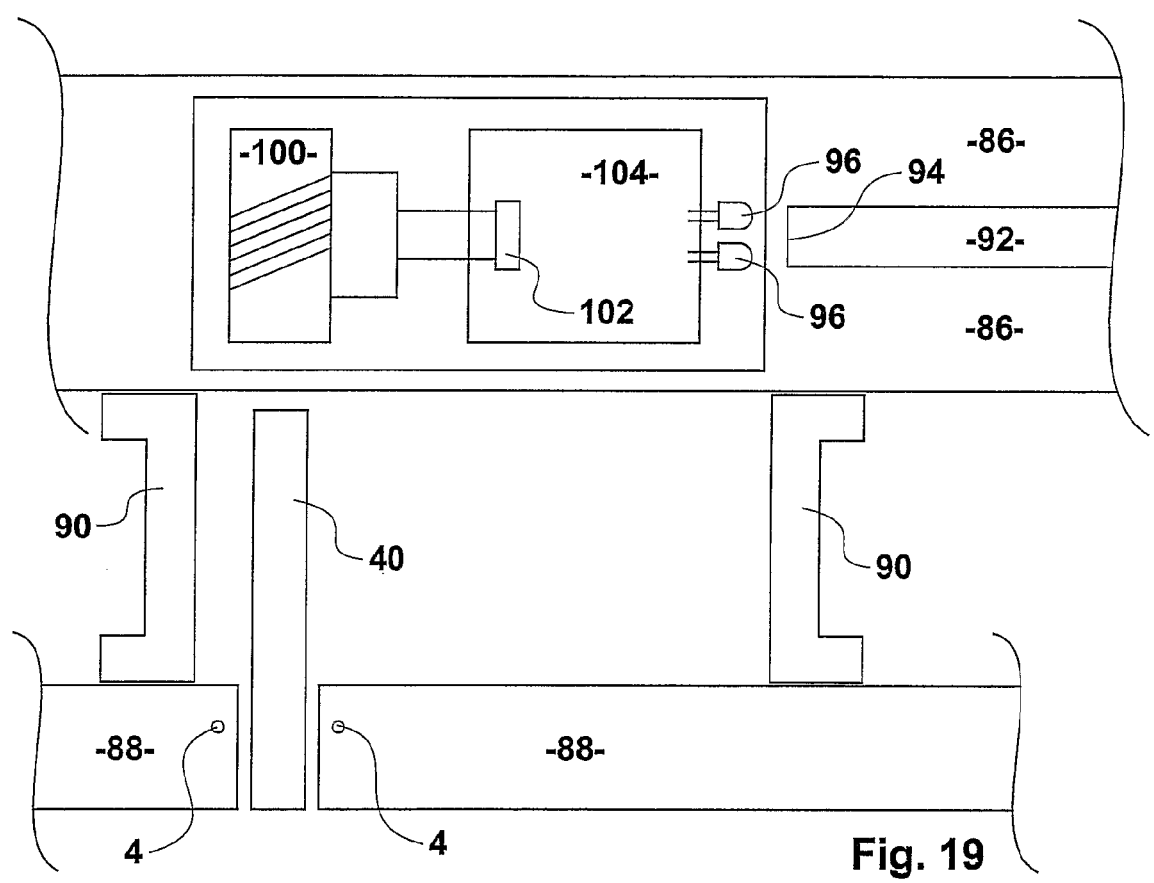

FIG. 8a is a partial elevation in cross section of an alternative form of inductive element to that shown in FIGS. 6a and 6b;

FIG. 8b: is a cross section through line BB of FIG. 8a;

FIG. 9a: is a partial elevation and cross section of an alternative inductor arrangement to that shown in the preceding Figures;

FIG. 9b: is a cross section through line CC of FIG. 9a;

FIG. 10a: is a partial elevation and cross section of an alternative inductor arrangement to that shown in the preceding Figures;

FIG. 10b: is a cross section through line DD of FIG. 10a;

FIG. 1a: is a partial elevation in cross section of an alternative inductor arrangement to that shown in the preceding Figures;

FIG. 11b: is a cross section through another alternative form of inductive element;

FIGS. 12 to 16: are diagrammatic elevations of arrangements of IPT field extension apparatus according to the invention;

FIG. 17: is a diagrammatic elevation in cross section through part of a roadway illustrating the use of a field extension device according to the invention;

FIG. 18: is a diagrammatic elevation in cross section through a pool installation illustrating use of a field extension device according to the invention; and FIG. 19: is an elevation in cross section of a handrail assembly including a field extension device.

DETAILED DESCRIPTION

Referring to FIG. 1, the basic structure of an IPT power supply (also sometimes referred to as an inductively coupled power transfer (ICPT) power supply system or a contactless power supply system) is shown generally referenced 1. The system generally comprises two electrically isolated parts. The first part consists of a power supply 2 which may comprise a resonant converter for example. The power supply supplies electrical energy to a primary conductive path 4 so that an alternating current is provided in the primary conductive path. The primary conductive path is usually provided in the form of an elongated cable or track from which one or more of the second parts (commonly referred to as "pick-ups") 5 are located. The primary conductive path may be provided with or beneath a roadway for example, and secondary pick-ups 5 which may comprise lighting elements such as illuminated road studs are adhered to the surface of the roadway.

Each of the pick-ups 5 includes a pick-up element such as a coil 8 which is located sufficiently close to the conductive path 4 (but not within electrical contact with the conductive path) to enable voltage to be induced in the pick-up coil 8 by mutual induction. Reference to coils includes multiple turns of conductive material as well as a single turn or partial turn. The pick-up coils 8 are tuned with the tuning capacitor 10 to augment the power transfer capability from the primary conductive path to each pick-up. The tuning, although shown in FIG. 1 as being achieved with a parallel connected capacitor, may also be achieved with a series connected capacitor.

The output from the tuned pick-up circuit comprising elements 8 and 10 is then typically rectified and fed to a controller. Discussion of one example of an appropriate controller, and a description which provides more information about the function and construction of IPT systems generally may be found with reference to the U.S. Pat. No. 5,239,308. That document describes partial decoupling of the pick-up coil to control the power flow to match the power taken from the primary conductive path to that required by a load supplied by each pick-up 6.

In order for effective power transfer to occur, the coils 8 of each of the pick-ups 6 must be within a certain distance from a primary conductive path 4. This distance will vary depending upon the system design, but may typically be only a few centimetres. In U.S. Pat. No. 6,317,338 an intermediate resonant circuit has been suggested, which comprises an inductive element and a capacitive element (although a separate capacitor as such may not necessarily be required) that may be physically located between the primary conductive path 4 and one or more pick-up coils 8. A resonant current is induced in the intermediate resonant circuit by the magnetic field associated with the primary conductive path 4. The current in the intermediate resonant circuit further produces a field which allows a secondary pick-up coil 8 to be located at a further distance from the primary conductive path 4 to achieve a given power transfer to the coil 8.

Turning to FIG. 2, a general diagram of an IPT system according to the present invention is shown generally referenced 10. In this system, the secondary pick-ups 6 comprise road studs. Although not shown, each road stud includes an appropriate control circuit and also includes one or more lighting devices such as light emitting diodes (LED's). Intermediate resonant circuits generally referenced 12 are provided, each circuit having a first lumped inductance 14 which is located substantially adjacent to the primary conductor 4, and a second lumped inductance 16 which is located adjacent to the pick-up coils 8 of the pick-ups 6. The coils 14 and 16 are directly or indirectly electrically connected to each other. In the examples shown in FIG. 2, tuning capacitances 18 are connected in series with the coils 14 and 16. However, the capacitances 18 may be provided in parallel with coils 14 and 16. The tuning capacitance 18 is chosen so that the circuit 12 as a whole will resonate at a desired resonant frequency to enhance the field generated by coil 16 and therefore augment the power transfer capability of the circuit 12 to pick-up 6.

A circuit 12 according to one embodiment of the invention is shown diagrammatically adjacent to a primary conductive path in FIG. 3. Typically the primary conductive path 4 comprises a cable in the form of an elongate loop which begins and ends at the power supply 2. The cable conductors will typically be provided closely adjacent to each other. However, at locations along the conductors where pick-ups 6 will be located (which may be referred to as "nodes"), the cable conductors may be separated apart a predetermined distance in order to provide an adequate magnetic flux path which may be intercepted by a pick-up, or a coil of an intermediate resonant circuit. For example, in a typical road stud application, the cable may be nearly any form of conductive cable, but we have found multi-strand copper cable preferable. The two conductors that form the overall loop of conductive material are typically separated by a distance of approximately 25 mm to 50 mm in the intended vicinity of a road stud or other pick-up. The preferred operating frequency for current in the primary conductive path is 38.4 kHz, but systems could be constructed from 100 Hz to some MHz depending on local radio regulations.

Therefore in FIG. 3 the primary conductive path 4 is shown in the form of a distribution cable the two separate conductors of which have been separated in the vicinity of first coil 14 to assist power transfer.

FIG. 4a diagrammatically shows a further coil 20 which is located adjacent to a second road stud 6 so that two road studs may be powered from the single intermediate resonant circuit. The overall circuit inductance and capacitance is chosen to maintain the desired resonant frequency. In FIG. 4b a construction is diagrammatically shown whereby the second coil 16 is used to power two road studs 6.

In FIG. 5, the general construction described with reference to FIGS. 3 to 4b is shown, but further includes a detuning capacitor 22 which is connected in parallel with the circuit tuning capacitor 18. The detuning capacitor 22 may also be connected in series with two back to back zener diodes 24. If desired, the back to back zener diodes may simply be connected across the tuning capacitor without the detuning capacitor 22, as we have found that a detuning capacitor is not necessary when using inductors that are formed about a bar or rod of ferrite or similar material. The diode construction limits the peak voltage in either direction and therefore provides a way of limiting circulating current. This is important because in practice if a load is not being supplied (for example if the road stud is not functioning or is required to be turned off then high circulating resonant currents may be induced in the intermediate resonant circuit. Such currents are undesirable for two reasons. Firstly, component ratings in the intermediate resonant circuit may be exceeded leading to failure of the device. Secondly, due to the mutual inductance between the inductor 14 of the intermediate circuit and primary conductor path 4, any high circulating currents will have an affect on the power supply for the primary conductive path which can lead to destabilisation of the supply and have a negative impact on overall system performance.

Turning now to FIGS. 6a and 6b, a practical embodiment of an intermediate resonant circuit in accordance with the invention is illustrated.

Referring to FIG. 6a, coil 14 is formed by winding a conductive material such as copper wire 28 about a ferrite core 30. Similarly, coil 16 may be formed by winding copper wire 32 about a ferrite core 34. Cores may not be necessary in some applications, or alternative core materials with similar electrical characteristics may be used such as FINEMET or GLASSMET, but we have found ferrite to be the most preferred material. The windings are electrically connected to each other as shown by wire 36 which may be a separate piece of conductive material which is connected to one end of each coil, or alternatively both coils may be constructed from the same length of material. The other end of each coil is connected to capacitor 18. The coil 14 is in use located within about 30 mm of the primary conductor.

The two back to back zener diodes 24 are connected in parallel with capacitor 18 to limit resonant currents in the circuit when no load is being supplied in use.

In the embodiment shown in FIGS. 6A and 6B the typical zener voltage is 48 V. Typical tuned circuit current is 0.5 A with the road stud in position and 0.7 A when the road stud is removed. Without the zener diodes 24, unloaded circulating current can rise above 4 A which may destroy the tuning capacitor and affect system efficiency.

In the embodiment shown in FIGS. 6a and 6b, the winding assemblies, capacitor 18 (which may typically be 100 nF) and zener diodes 24 may be mounted on a rigid substrate, such as a printed circuit board (PCB) 36. This has the advantage that the components are more easily electrically connected together while still being maintained in an appropriate physical relationship. Therefore, the ferrite coils 30 and 34 may be glued or otherwise affixed to the circuit board for example, and each end of the windings wound about the coils may be electrically connected (for example by soldering) to conductive tracks on the board. In this way, there are no loose wires within the assembly. Similarly, the capacitor 18 and zener diodes 24 may be soldered to electrically conductive tracks on the board so that the desired electric circuit is established.

As can be seen more clearly in 6b, the PCB 36 together with the components mounted on the PCB is provided within a housing 40. In the preferred embodiment housing 40 takes the form of an elongate sleeve which is cylindrical in form. Those skilled in the art will appreciate that a variety of different cross sectional shapes may be used rather than the circular shape shown in the drawing figures. The housing 40 is preferably constructed from a flexible material, but one which has sufficient rigidity to house the required components so that the assembled unit may be handled and installed in the field. For example, the housing is preferably sufficiently robust to allow the construction 12 to be pushed into a hole formed in a roadway which may be formed from loose aggregate, or concrete or steel materials. The most preferred material for constructing the housing is 25 millimetre PVC conduit having a wall thickness of 2 mm, for example standard electrical high impact grade conduit.

In the most preferred form, the space between the components within the housing and the housing itself is filled with a filler material that provides a matrix within which the required components are encased or surrounded so that they are securely held within the housing. It is preferable that the filler material is also flexible or allows movement (such as flexing) of the housing, as this has advantages in various installations as will be described further below. Furthermore, we have found that a substantially resilient or elastic compound (which therefore provides properties of flexibility in use) has a number of practical advantages. In particular the physical unit when installed in a number of practical situations can be subject to physical movement such as vibration which has potential to be extremely damaging to electronic components or their physical assembly. One example is use of IPT systems in roadways where frequent use of heavy vehicles which travel at speed can cause significant vibration or similar movement. A filler material which is resilient or elastic insulates the components of the circuit against this movement. Furthermore, the filler material may have the advantage of assisting with electrical insulation, and has the further advantage that it assists with maintaining a desired position of the components within the housing so that a "unitary" robust product is provided which would resist ingress of any foreign matter such as water, dirt etc.

A number of different materials may be used to construct the housing and provide the filler. In some embodiments, any electrically nonconductive material may be used for the housing and the filler. In some applications are may be desirable to use materials which have a specified fire ratings. For example, it may be desirable to construct the other housing from a surrounded material such as a glass ceramic and to provide a particular material for the filler, for example silicon sand. These materials have a high fire rating, so they may be used for installation of IPT systems in tunnels, bridges, buildings or other structures where the primary conductive path may be disposed in a cable duct or maintenance duct. The extended devices 12 may be placed in holes drilled into a wall adjacent to the duct. Providing the devices 12 with an appropriate fire rating can be important to reduce fire risk.

We have found that epoxy resin, particularly electrical grade epoxy resin provides a suitable filler material compound. However, other materials which provide electrical insulation and have a property of elasticity or resilience may also be provided, such as polyurethanes for example.

Turning now to FIG. 7, it will be seen that the housing may be separated into two parts 40a and 40b with housing 40a including a first PCB 36a and housing 40b containing a second PCB 36b. The first winding 14 is provided in the first part 40a and the second winding 16 is provided in part 40d together with capacitor 18 and zener diodes 24. Alternatively, the capacitor and zener diodes may be provided in housing part 40a, or in a separate housing, or in material intermediate of the two housing parts 40a and 40b. The desired circuit is completed by two core cable 42 (e.g. 1.5 mm two core cable) which is connected for example by soldering or by using appropriate electrical plugs, sockets or similar connectors to terminals provided on each circuit board so that the required circuit is made as described above with reference to the preceding figures.

In the most preferred form, the electrical connection between the two circuit paths is made, and then each housing is filled with epoxy resin, so that the electrical connections are sealed against any ingress of water or dirt or other foreign matter which may affect circuit performance. The advantage with having the housing effectively split into two separate parts which are joined by flexible conductive material is that the intermediate resonant circuit can be used to supply electrical energy to a pick-up which is quite remote from the primary conductive path. One example is diagrammatically illustrated in FIG. 16 where it can be seen that the first coil is provided adjacent to a conductive primary path 4 and second coil 16 is provided a considerable distance away (and possibly via a tortuous path through a floor, wall or various other structural components) to power an illuminated exit sign 44. Therefore, the overall construction has the advantage that an elongate primary conductor may be provided during construction of a building, for example through the floor of a building, and then lights or other electrical apparatus within the building may be supplied with electrical energy without contacts needing to be hardwired into the building structure. This also had the advantage that electrical connections do not need to be broken if the building is reconfigured, for example if an office is being repartitioned. We have found that the coils 14 and 16 may be separated by a distance up to two metres using standard cable to interconnect them, and longer distances are possible if litz wire is used.

Referring now to FIGS. 8a and 8b a first alternative form of coil configuration is shown. Further alternative coil configurations are also shown in FIGS. 9a through 10b and these will each be discussed with reference to coil 14 i.e. the coil which intercepts the field associated with the primary conductors. However, these arrangements could also be applied to second coil 16.

In FIG. 8a, the elongate ferrite core 30 has been substituted for a ferrite E core 50. One each of the separated primary conductors is placed within the gaps 52 and 54 between the legs of the E core. The wire 28 is wound about the base of the core. A cross section through a part of the core (indicated by lines BB in FIG. 8A) is shown in FIG. 8b.

Turning to FIG. 9a, the first coil 14 may alternatively be formed the using a ferrite toroidal core 60 which has an opening 62 to allow one of the separated primary conductors 4 to be placed in a central position within the toroid. The winding 28 is made about the body of the toroid as shown. For further clarity, FIG. 9b shows a cross section taken through lines CC of FIG. 9a.

In FIG. 10a a ferrite pot core 64 is shown within an end of housing 40, with the winding 28 disposed about the central leg 66 of the core. FIG. 10b shows a cross section through line DD of FIG. 10a. Such a pot core may be used to form winding 14, and we have found that this arrangement allows the apparatus to function effectively even when closely adjacent to steel materials.

In FIG. 11a, another ferrite pot core 68 is shown having gaps 70 through which primary conductors 4 may be introduced into the pot core. Therefore core 68 remains in association with the primary conductor, and a pot core 64, as described with reference to FIGS. 10a and 10b, can be placed in contact with or adjacent to core 68 to facilitate magnetic coupling.

Similarly, referring to FIG. 11b, the primary conductors 4 may be placed between the legs of a ferrite E core 72 against which ferrite E core 50 (refer FIG. 8a and 8b) may be placed to facilitate good magnetic coupling.

Cable ties (not shown) may be used in practice to ensure that the apparatus 12 is located within a desired physical proximity of the primary conductor. In the embodiments where the ferrite cores extend beyond the housing, additional physical support such as a conduit box may be provided. Alternatively the environment or position of the primary conductor and the apparatus 12 may be such that no additional support is required.

Figure 12:
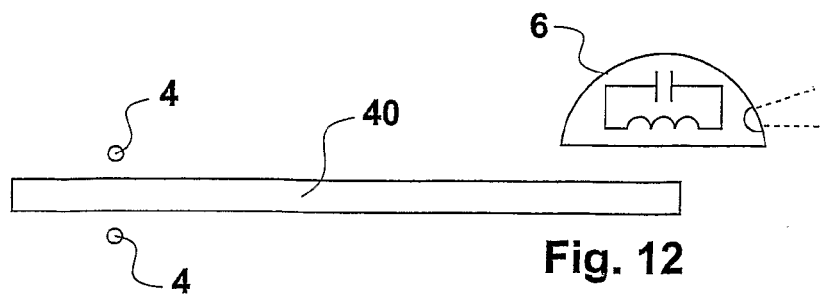
Figure 13:
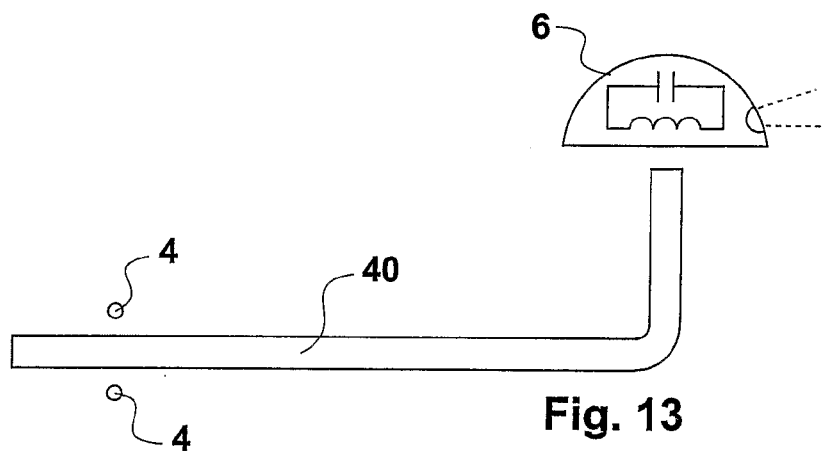

Referring now to FIGS. 12 to 15, the constructions described above are shown in various practical implementations in diagrammatic form. For convenience and ease of illustration, only the housing 40 of each isolated tuned intermediate circuit assembly 12 is shown. In FIG. 12, it can be seen that the construction can be provided horizontally. In FIG. 13, the advantageous ability of the apparatus to flex is illustrated. To enable this construction to be possible, a construction similar to that described with reference to FIG. 7 may be used whereby the housing is provided in one part, but the circuit board is provided in two parts. An appropriate flexible conductor provides the electrical connection between the circuit boards which are held in their positions at either end of the housing 40. Depending on the nature of the conductors and the filler material within the housing, the filler may be provided in portions of the housing adjacent each end so as to substantially enclose or encase the circuit boards, or alternatively the compound may be provided throughout the length of the housing.

Figure 14:
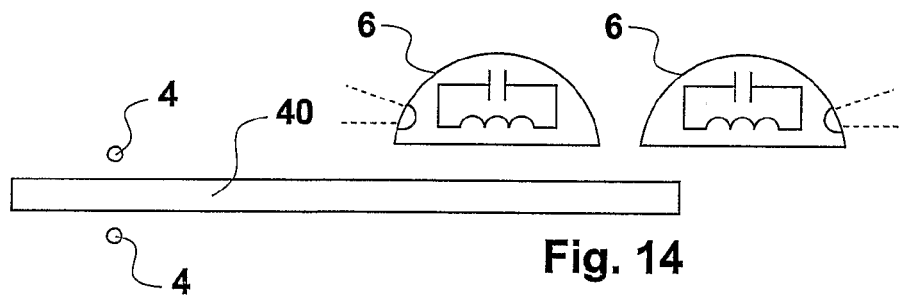

In FIG. 14, it will be seen that more than one pick-up can be supplied by the single field extension. As illustrated in FIG. 4b, a single second core 16 may provide a field sufficient to power two pick-ups. Alternatively, depending on the power requirements of the pick-ups and their physical location or proximity to each other, a separate coil 20, as shown in FIG. 4a, may be required. In a practical embodiment of the invention, further coil 20 may be replicated in the same way as coil 16. Therefore, a separate ferrite core may be provided for attachment to the circuit board, and coil 20 may be formed on this separate ferrite core. The further coil 20 may also be provided on a separate piece of PCB to allow flexible construction to be achieved.

Figures 15, 16:
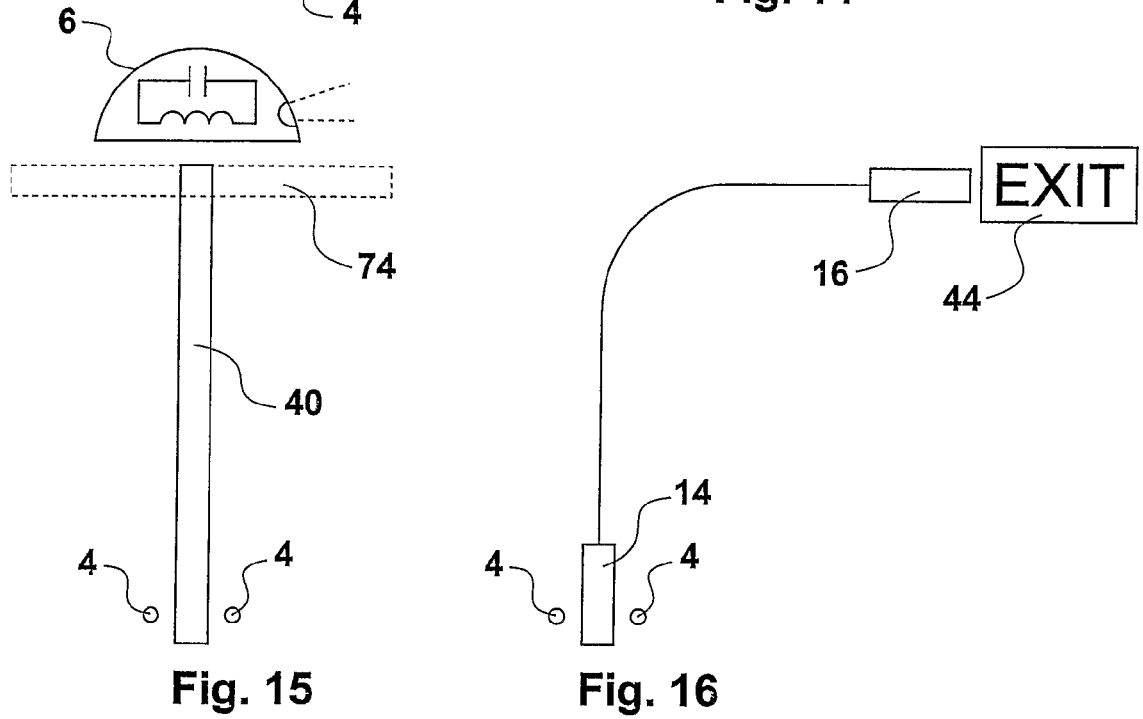

Turning to FIG. 15, the isolated tuned circuit construction 12 is shown in a vertical orientation in which it may be disposed within a roadway for example with the upper surface 74 of the roadway comprising a sealed surface, a cobblestone surface, bricks or a driveway surface which may be a loose particulate material. Use of the circuit construction 12 for these high movement applications is highly desirable since fixed hard wired systems in these applications will frequently fail due to movement. We have also found that the circuit construction 12 will still operate effectively with a roadway (such as the bridge) with a steel upper surface or layer 74.

Turning now to FIG. 17, a further embodiment is shown diagrammatically in use in a roadway system. In some applications, the roadway may comprise a structure such as bridge deck 76 over which the roadway surface 78 is disposed. Due to variations in the depth of the bridge deck throughout the structure (and/or to allow for physical expansion and contraction of the bridge structure) it is desirable to have a field extension circuit which may expand or contract. We have found that we may make provision for extension contraction by effectively telescoping the housing 40 so that a first housing part 40c is of a sufficient diameter to receive a second housing path 40d. Housing part 40c contains first coil 14 and part 40d contains the second coil 16 which may be sealed within the respective parts as described above. One of the housing parts includes any other necessary components such as capacitor 18 and zener diodes 24 (although these components may be distributed between the housing parts if desired). The circuit is completed by using flexible cable 42 as described above with reference to the embodiments shown in FIG. 7. Therefore, in use the two housing parts may move relative to each other while the cable between sections is securely housed within the housing assembly. This telescoping construction also has the advantage that the housing sections are maintained in physical contact.

In FIG. 18, example of use of the invention in a pool environment is shown diagrammatically. The pool structure 80 may be made of an appropriate structural material such as structural concrete or steel. This will typically have an internal coating 82 that may include a water proof seal which is covered with plaster, paint or other suitable internal materials to provide a barrier between the liquid (not shown) within space 84 of the pool and the pool structure. The pool lights are frequently a desirable feature for users of swimming pools, but lights pose a problem in terms of electrical connection, so the installation of lights usually also means installing costly seals within the pool structure to allow fixed wiring to be installed to reach the light connections without exposing the connections to any water. This problem is overcome by the present invention. As can be seen from FIG. 18, a hole can be drilled into the pool structural material 80 without penetrating the internal coating 82, and circuits 12 can be placed in each hole. A primary conductive loop can then be placed about the outside of the pool structure. Sealed light units can then simply be affixed to the internal pool wall in the appropriate places adjacent to coils 16 of the intermediate circuits 12.

In FIG. 19 application of the invention to a handrail installation is also shown diagrammatically. A handrail 86 is affixed at a number of places to a concrete wall 88 by mounting brackets 90. Within handrail 86 a reflective light pipe 92 is provided which has one end 94 open to the light source such as LED's 96. Primary conductors 4 are encased within concrete wall 88, and a hole 98 has been drilled within the wall within which circuit 40 is disposed so that coil 14 (not shown) is adjacent to conductors, and coil 16 (not shown) is adjacent to a ferrite pick-up assembly 100 which is tuned by a capacitor 102 at an appropriate frequency to optimise or at least augment power transfer to the pick-up. A control circuit 104 (which may be similar to the circuit disclosed in U.S. Pat. No. 6,317,338) controls the transfer of power to the pick-up to supply the LED's which illuminate the reflective light pipe 92. The invention has the advantage that it allows the primary conductor to be buried in the concrete wall rather than having to be contained within the handrail which is something that may well be damaged as a result of fire, for example, or traffic accidents or through general wear and tear.

The invention has a number of practical applications and significant advantages over known systems. In particular the isolated tuned circuit allows physical as well as electrical isolation. Therefore, it enables primary cables to be run though cable ducts in bridges for example which are often some distance from the point at which power is required to be supplied. Also, primary cables may be protected from fire or other damage by being located deep in a structural material such as concrete, and still provide a functional IPT system. Finally, the invention is easily manufactured and installed. Installation only requires a hole to be made, and this can be achieved by drilling, with minimal disruption.

Various changes and modifications to the presently preferred embodiments of the invention described herein will be apparent to those skilled in the art. Such changes and modifications may be made without departing from the spirit and scope of the present invention and without diminishing its attendant advantages. It is therefore intended that such changes and modifications be included within the scope of the invention as defined in the appended claims.

The preferred features of the invention are applicable to all aspects of the invention and may be used in any possible combination. Where the words "comprise" "have" or "contain" are used in this document, or variations of these word such as comprises and comprising, these are intended to be interpreted in an inclusive sense i.e. to mean "including but not limited to" unless the context clearly dictates the contrary.

The invention claimed is:

1. An IPT system field extension device including:
a first coil adapted to receive energy from a magnetic field associated with a primary conductive path of an IPT system;
a second coil electrically connected to the first coil and provided remote from the first coil, and being adapted to produce a magnetic field for supply of electrical energy to a pick-up of an IPT system; and
a tuning capacitance provided in series or parallel with the first and second coils to enable the circuit so formed to have a desired resonant frequency.

2. A field extension device as claimed in claim 1 wherein the first coil is retained within a first housing and the second coil is retained within a second housing.

3. A field extension device as claimed in claim 2 wherein one of the first or second housings is at last partly received within the other of the first or second housings.

4. A field extension device as claimed in claim 2 wherein a filter material is provided between each coil and its respective housing part.

5. A field extension device as claimed in claim 4 wherein the filler material comprises an electrically non-conductive material.

6. A field extension device as claimed in claim 4 wherein the filler material comprises a material having property of elasticity or resilience.

7. A field extension device as claimed in anyone of claims 4 wherein the filler material comprises an epoxy resin.

8. A field extension device as claimed in claim 4 wherein the filler material comprises a particulate material.

9. A field extension device as claimed in claim 8 wherein the particulate material comprises silicone sand.

10. A field extension device as claimed in claim 2 wherein each housing part is constructed from a cylindrical plastics material.

11. A field extension device as claimed in claim 10 wherein the housing is constructed from PVC conduit.

12. A field extension device as claimed in claim 10 wherein the housing is constructed from a ceramic material.

13. A field extension device as claimed in claim 2 wherein the housing and filler material are constructed from flexible material.

14. A field extension device as claimed in claim 1 further including an elongate housing having a first end and a second end, the first coil being provided at or adjacent to the first end of the housing and the second coil being provided at or adjacent to the second end of the housing.

15. A field extension device as claimed in anyone of the preceding claims wherein the first or second coil is formed about a ferrite core.

16. A field extension device as claimed in claim 15 were in the ferrite core comprises one of an E core, a toroid, or a pot core.

17. An IPT system including: a primary conductor;
at least one pick-up coil capable of generating a voltage by magnetic induction form the primary conductor;
an intermediate resonant circuit provided between the primary conductor and a pick-up coil, the intermediate resonant circuit including a first coil adapted to receive energy from a magnetic field associated with a primary conductive path of an IPT system, a second coil electrically connected to the first coil and being adapted to produce a magnetic field for supply of electrical energy to a pick-up of an IPT system, the first coil being provided adjacent to the primary conductive path, the second coil being provided adjacent to the at least one pick-up coil, and a tuning capacitance provided in series or parallel with the first and second coils to enable the circuit so formed to have a desired resonant frequency.

18. An IPT system as claimed in claim 17 wherein the first coil is retained within a first housing and the second coil is retained within a second housing.

19. An IPT system as claimed in claim 18 wherein one of the first or second housings is at last partly received within the other of the first or second housings.

20. An IPT system as claimed in claim 18 wherein a filler material is provided between each coil and its respective housing part.

21. An IPT system as claimed in claim 20 wherein the filler material comprises an electrically non-conductive material.

22. An IPT system as claimed in claim 20 wherein the filler material comprises a material having property of elasticity or resilience.

23. An IPT system as claimed in claim 20 wherein the filler material comprises an expoxy resin.

24. An IPT system device as claimed in claim 20 wherein the filler material comprises a particulate material.

25. An IPT system as claimed in claim 24 wherein the particulate material comprises silicone sand.

26. An IPT system as claimed in claim 19 wherein each housing part is constructed from a cylindrical plastics material.

27. An IPT system as claimed in claim 26 wherein the housing is constructed from PVC conduit.

28. An IPT system as claimed in claim 18 wherein the housing is constructed from a ceramic material.

29. An IPT system as claimed in claim 18 wherein the housing and filler material are constructed from flexible material.

30. An IPT system as claimed in claim 17 wherein the intermediate resonant circuit includes an elongate housing having a first end and a second end, the first coil being provided at or adjacent to the first end of the housing and the second coil being provided at or adjacent to the second end of the housing.

31. An IPT system as claimed in claim 17 wherein the first or second coil is formed about a ferrite core.

32. An IPT system as claimed in claim 31 wherein the ferrite core comprises one of an E core, a toroid, or a pot core.

33. A pathway including an IPT system according to claim 17.

34. A tunnel including an IPT system according to claim 17.

35. A handrail assembly including an IPT system according to claim 17.

36. A pool installation including an IPT system according to claim 17.

37. A method of producing an IPT system field extension device, a method including steps of:
   providing a first coil;
   providing an elongate housing having an interior space;
   placing the first coil in the interior space to locate the first coil at or adjacent to one end of the housing;
   providing a second coil;
   placing the second coil in the interior space to locate the second coil at or adjacent to another end of the housing;
   filling the space between the housing and the coils with a filler material.

38. A method of installing an IPT system including the steps of laying a primary conductive path in a channel such that the primary conductive path is substantially surrounded by stationary material, drilling at least one hole in the stationary material, providing an IPT system field extension device as claimed in claim 1 in the at least one hole, and locating an IPT pick-up adjacent to the entrance to the hole remote from the primary conductive path.

39. An IPT field extension device substantially as herein described with reference to anyone of the embodiments shown in the accompanying drawings.

40. An IPT system substantially as herein described with reference to anyone of the embodiments shown in the accompanying drawings.

41. A method of producing an IPT system field extension of device substantially as herein described with reference to anyone of the embodiments shown in the accompanying drawings.

42. A method of installing an IPT system substantially as herein described with reference to anyone of the embodiments shown in the accompanying drawings.

* * * * *